(12) United States Patent
Qu

(10) Patent No.: US 8,693,420 B2
(45) Date of Patent: Apr. 8, 2014

(54) SYSTEM AND METHOD FOR SIGNALING AND TRANSMITTING UPLINK REFERENCE SIGNALS

(75) Inventor: Bingyu Qu, Schaumburg, IL (US)

(73) Assignee: FutureWei Technologies, Inc., Plano, TX (US)

( * ) Notice: Subject to any disclaimer, the term of this patent is extended or adjusted under 35 U.S.C. 154(b) by 185 days.

(21) Appl. No.: 13/207,278

(22) Filed: Aug. 10, 2011

(65) Prior Publication Data

US 2013/0039387 A1 Feb. 14, 2013

(51) Int. Cl.
*H04W 4/00* (2009.01)

(52) U.S. Cl.
USPC .......................................... 370/329; 455/450

(58) Field of Classification Search
USPC ................. 370/310, 328, 329, 330, 350, 342; 375/138.14
See application file for complete search history.

(56) References Cited

U.S. PATENT DOCUMENTS

| | | | | |
|---|---|---|---|---|
| 2008/0225791 | A1* | 9/2008 | Pi et al. ........................... | 370/330 |
| 2008/0240028 | A1* | 10/2008 | Ding et al. ..................... | 370/329 |
| 2009/0046645 | A1 | 2/2009 | Bertrand et al. | |
| 2009/0060004 | A1* | 3/2009 | Papasakellariou et al. ... | 375/140 |
| 2009/0135803 | A1 | 5/2009 | Luo et al. | |
| 2010/0034312 | A1 | 2/2010 | Muharemovic et al. | |
| 2010/0067464 | A1* | 3/2010 | Higuchi ......................... | 370/329 |
| 2010/0110929 | A1 | 5/2010 | Li et al. | |
| 2010/0177688 | A1* | 7/2010 | Kishiyama et al. ........... | 370/328 |
| 2011/0176502 | A1 | 7/2011 | Chung et al. | |
| 2011/0317745 | A1* | 12/2011 | Okubo et al. .................. | 375/140 |
| 2012/0218988 | A1* | 8/2012 | Xu et al. ........................ | 370/350 |
| 2013/0010833 | A1* | 1/2013 | Ogawa et al. .................. | 375/138 |

OTHER PUBLICATIONS

"3rd Generation Partnership Project; Technical Specification Group Radio Access Network; Evolved Universal Terrestrial Radio Access (E-UTRA); Physical Channels and Modulation (Release 8)," 3GPP TS 36.211, V8.9.0, Technical Specification, Dec. 2009, 83 pages.
"3rd Generation Partnership Project; Technical Specification Group Radio Access Network; Evolved Universal Terrestrial Radio Access (E-UTRA); Physical Channels and Modulation (Release 9)," 3GPP TS 36.211, V9.1.0, Technical Specification, Mar. 2010, 85 pages.
"3rd Generation Partnership Project; Technical Specification Group Radio Access Network; Evolved Universal Terrestrial Radio Access (E-UTRA); Physical Channels and Modulation (Release 10)," 3GPP TS 36.211, V10.2.0, Technical Specification, Jun. 2011, 103 pages.
"3rd Generation Partnership Project; Technical Specification Group Radio Access Network; Evolved Universal Terrestrial Radio Access (E-UTRA); Physical Layer Procedures (Release 8)," 3GPP TS 36.213, V8.8.0, Technical Specification, Sep. 2009, 77 pages.

(Continued)

*Primary Examiner* — Anh-Vu Ly
*Assistant Examiner* — Gustavo Lopez-Vargas
(74) *Attorney, Agent, or Firm* — Slater & Matsil, L.L.P.

(57) ABSTRACT

A system and method for signaling and transmitting uplink reference signals are provided. A method for communications controller operations includes signaling information about a set of sequence groups to a first communications device, where the first communications device uses a sequence in the set of sequence groups to modulate a reference signal. The method also includes selecting a sequence group from the set of sequence groups and signaling information about the selected sequence group to the first communications device.

47 Claims, 7 Drawing Sheets

(56) References Cited

OTHER PUBLICATIONS

"3$^{rd}$ Generation Partnership Project; Technical Specification Group Radio Access Network; Evolved Universal Terrestrial Radio Access (E-UTRA); Physical Layer Procedures (Release 9)," 3GPP TS 36.213, V9.3.0, Technical Specification, Sep. 2010, 80 pages.

"3$^{rd}$ Generation Partnership Project; Technical Specification Group Radio Access Network; Evolved Universal Terrestrial Radio Access (E-UTRA); Physical Layer Procedures (Release 10)," 3GPP TS 36.213, V10.2.0, Technical Specification, Jun. 2011, 120 pages.

International Search Report and Written Opinion received in International Application No. PCT/US12/50351, mailed Oct. 16, 2012, 8 pages.

\* cited by examiner

SYSTEM AND METHOD FOR SIGNALING AND TRANSMITTING UPLINK REFERENCE SIGNALS

TECHNICAL FIELD

The present invention relates generally to digital communications, and more particularly to a system and method for signaling and transmitting uplink reference signals.

BACKGROUND

Generally, in a communications system, such as a Third Generation Partnership Project (3GPP) Long Term Evolution (LTE) compliant communications system, there is a plurality of communications controllers. The plurality of communications controllers serves communications devices by controlling communications to and from the communications devices. Communications controllers may also be commonly referred to as enhanced NodeBs, NodeBs, base stations, controllers, and so on. Communications devices may also be commonly referred to as User Equipment, mobile stations, users, subscribers, terminals, and so forth.

FIG. 1 illustrates a prior art communications system 100. As shown in FIG. 1, communications system 100 includes an enhanced NodeB (eNB) 105 and a User Equipment (UE) 110. eNB 105 and UE 110 may communicate over a communications link 115. Communications link 115 may comprise a first uni-directional link 120, referred to as a downlink (DL), from eNB 105 to UE 110 and a second uni-directional link 125, referred to as an uplink (UL), from UE 110 to eNB 105. Transmissions from eNB 105 to UE 110 take place over DL 120, while transmissions from UE 110 to eNB 105 take place over UL 125.

Typically, a resource allocation (for example, time resources, frequency resources, and/or time-frequency resources) for an UL may be Frequency Division Multiplexed (FDM) and/or Time Division Multiplexed (TDM) for different UEs to avoid inter-cell interference. As an example, two UEs may use different resource blocks for UL transmission, wherein a resource block comprises a number of subcarriers in a specific time unit, such as a slot.

SUMMARY OF THE INVENTION

These technical advantages are generally achieved, by example embodiments of the present invention which provide a system and method for signaling and transmitting uplink reference signals In accordance with an example embodiment of the present invention, a method for communications controller operations is provided. The method includes signaling information related to a set of sequence groups to a first communications device, where the first communications device uses a sequence in the set of sequence groups to modulate a reference signal. The method also includes selecting a sequence group from the set of sequence groups, and signaling information related to the selected sequence group to the first communications device.

In accordance with another example embodiment of the present invention, a method for communications device operations is provided. The method includes decoding a first signaling from a communications controller to retrieve information related to a set of sequence groups, decoding a second signaling from the communications controller to retrieve information related to a selected sequence group, modulating a reference signal with a sequence from the selected sequence group, and transmitting the modulated reference signal.

In accordance with another example embodiment of the present invention, a device is provided. The device includes a scheduler, and a signaling unit. The scheduler selects a sequence group from a set of sequence groups, and the signaling unit signals information related to the set of sequence groups to a first communications device, where the first communications device uses a sequence in the set of sequence groups to modulate a reference signal, and signals information related to the selected sequence group to the first communications device.

In accordance with another example embodiment of the present invention, a communications device is provided. The communications device includes a first signaling decoding unit, a second signaling decoding unit, a transmission prepare unit, and a transmitter. The first signaling decoding unit decodes a first signaling from a communication controller to retrieve information related to a set of sequence groups, the second signaling decoding unit decodes a second signaling from the communications controller to retrieve information related to a selected sequence group, the transmission prepare unit modulates a reference signal with a sequence from the selected sequence group, and the transmitter transmits the modulated reference signal.

In accordance with another example embodiment of the present invention, a method for communications controller operations is provided. The method includes signaling information related to a first set of sequence groups to a first communications device served by a communications controller, signaling information related to a second set of sequence groups to a second communications device served by the communications controller, and selecting a first sequence group from the first set of sequence groups for the first communications device. The method also includes selecting a second sequence group from the second set of sequence groups for the second communications device, where the first sequence group differs from the second sequence group. The method further includes signaling information related to the first sequence group to the first communications device, and signaling information related to the second sequence group to the second communications device.

One advantage disclosed herein is that UEs may use multiple sequence groups to achieve UL reference signal orthogonality, which helps demodulation performance of UL transmissions.

A further advantage of exemplary embodiments is that a multi-stage, multi-layer signaling technique allows for a partitioning of sequence group signaling, which may help to reduce signaling overhead and to dynamically allocate UL RS sequence and therefore, improve overall communications performance.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the current example embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to example embodiments in a specific context, namely a 3GPP LTE Release 11 and later compliant communications system. The invention may also be applied, however, to other standards compliant communications systems, such as those that are IEEE 802.16, WiMAX, and so on, compliant, as well as non-standards compliant communications systems that support the use of an UL reference signal to help demodulate UL transmissions.

In order to support higher communications system throughput, UL spatial division multiple access may be used. In UL spatial division multiple access, multiple UEs may use the same resource blocks or overlapping frequency resources (where part of the resource blocks are the same) for UL transmission. A commonly used form of UL spatial division multiple access is referred to as Multi-User Multiple Input, Multiple Output (MU-MIMO) or virtual MIMO.

Usually, a UL reference signal (RS) may be transmitted by the UE in order to support coherent demodulation of a data channel by the eNB. As an example, in a two slot UL transmission, some symbols in the UL transmission may be used to transmit the UL RS for demodulation purposes, while other symbols in the UL transmission may be used for data transmission. In a transmission on an UL of a 3GPP LTE compliant communications system, a symbol may be an Orthogonal Frequency Division Multiplexed (OFDM) symbol or a Single Carrier Frequency Division Multiple Access (SC-FDMA) symbol depending upon a multiple access scheme used by the communications system for the UL. Generally, the UL RS may use the same resource blocks as the data channel. In legacy UEs (i.e., UEs compliant with 3GPP LTE Release 8, 9, and/or 10), a cell identifier specific sequence group comprising a plurality of sequences may be allocated for use by the UE for UL RS use.

Figure 1:
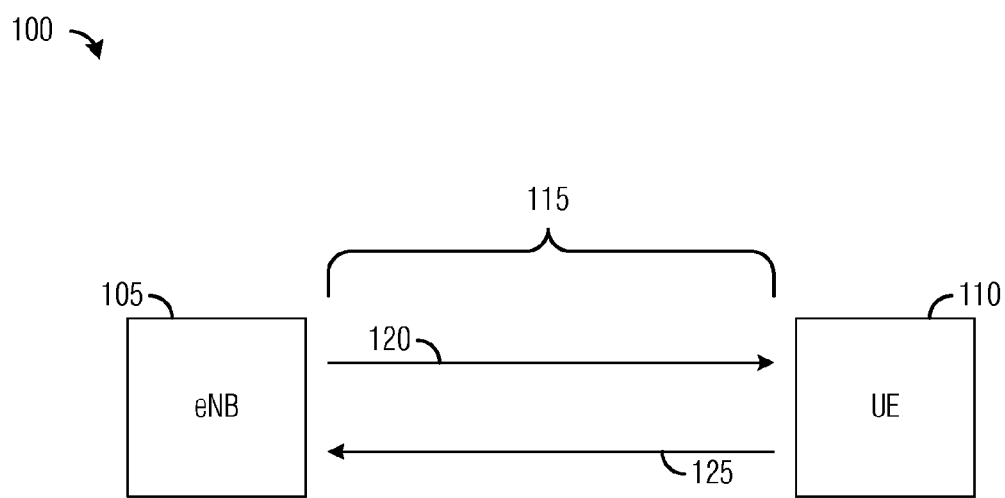
FIG. 1 illustrates an example prior art communications system.
Figure 2:
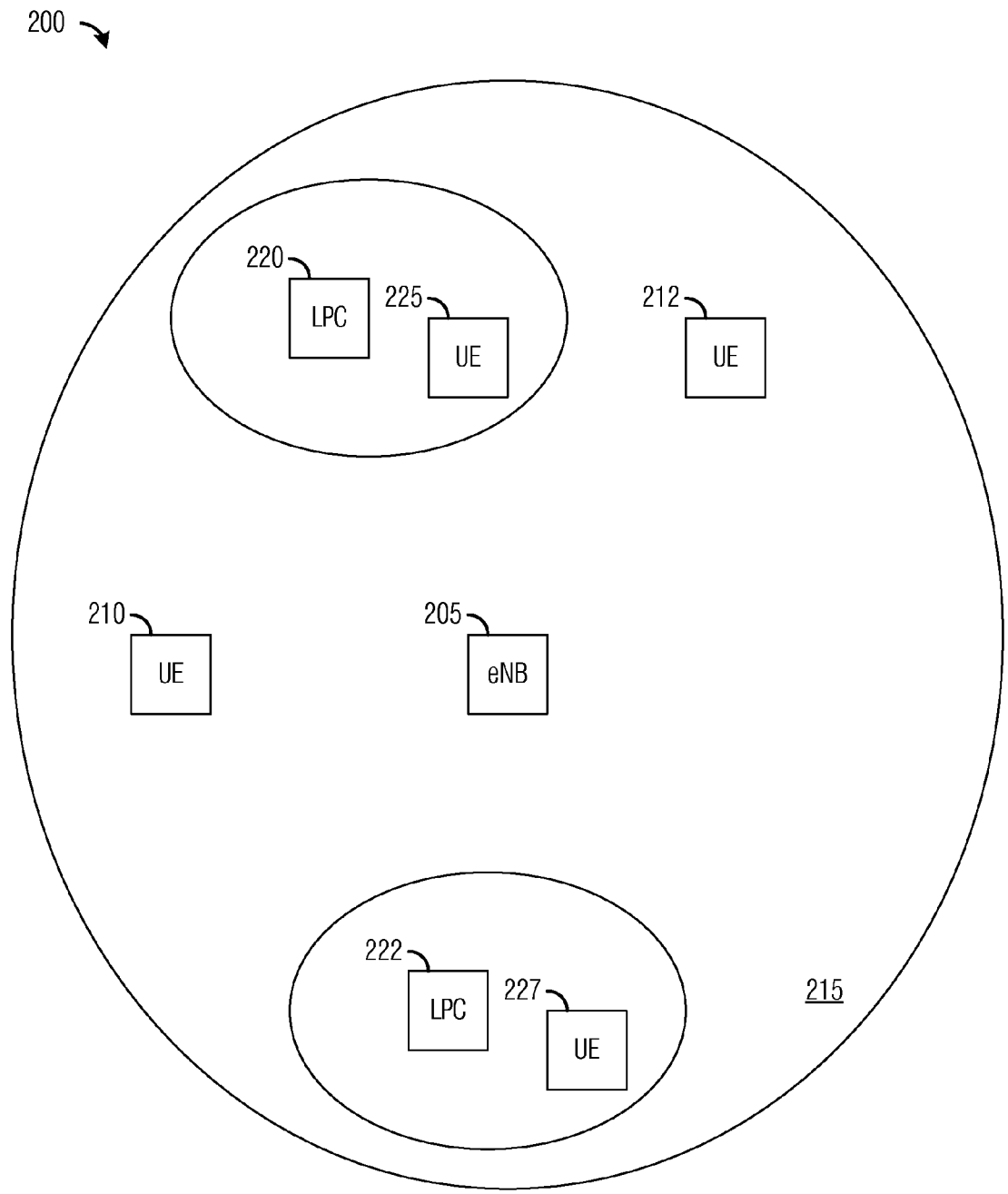
FIG. 2 illustrates an example communications system according to example embodiments described herein.

FIG. 2 illustrates a communications system 200. Communications system 200 includes an eNB 205 serving UEs, such as UE 210 and UE 212. Also operating within a coverage area 215 of eNB 205 are low power cells (LPC), such as LPC 220 and LPC 222. An LPC may be considered to be a low power communications controller that may be deployed to improve coverage in weak signal areas, improve performance in high UE density areas, and so forth. As shown in FIG. 2, LPC 220 is serving UE 225, while LPC 222 is serving UE 227. eNBs, which may commonly be referred to as macro cells, are part of a planned network and transmit at high power levels. Although shown in FIG. 2 as physical entities, communications controllers, such as eNBs and LPCs, may be logical entities. In such a situation, the communications controllers may reside within one or more discrete locations and control remotely located cells, antenna arrays, and so forth.

While it is understood that communications systems may employ multiple eNBs and/or LPCs capable of communicating with a number of UEs, only one eNB, two LPCs, and four UEs are illustrated for simplicity.

As stated previously, in MU-MIMO multiple UEs that are relatively close together, or more generally, multiple UEs with transmissions that have relatively similar received signal strength at an antenna, may use the same resource blocks or overlapping frequency resources if the signals from the multiple UEs may be differentiated in spatial domain with multiple reception antennas. When the same resource blocks or overlapping frequency resources are used by UEs that have similar received signal strength at an antenna, orthogonal UL RSs may be used since channel estimation may be performed based on the UL RS and the use of non-orthogonal UL RSs may lead to sub-par performance due to interference between the non-orthogonal UL RSs. As an example, consider UE 212 and UE 225, which are operating relatively closely together and hence, have similar received signaling strength at an antenna (for example received by an antenna at LPC 220). If UE 212 and UE 225 are using the same resource blocks or overlapping frequency resources (assuming that their data channels can be differentiated in the spatial domain), interference may occur for their respective UL RSs unless orthogonal UL RSs are used. On the other hand, UE 212 and UE 227, which may be far apart and signals transmitted by UE 212 and UE 227 may be received by different LPCs. Hence there may be little to no interference for their respective UL RSs even if non-orthogonal UL RS are used. For example, the signal from UE 212 is received by LPC 220 and/or LPC 222, but the signal from UE 227 may be received by LPC 222 only.

Figure 3:
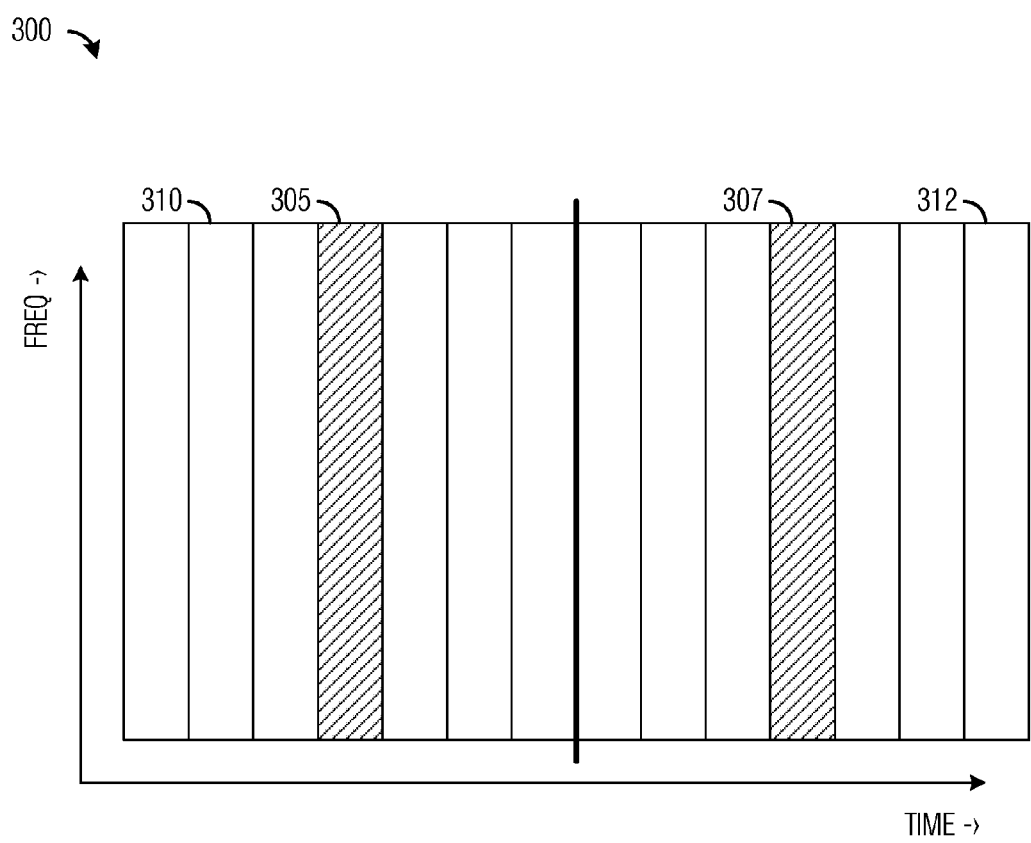
FIG. 3 illustrates an example UL channel structure used in a 3GPP LTE or a 3GPP LTE Advanced (LTE-A) compliant communications system according to example embodiments described herein.

FIG. 3 illustrates an UL channel structure 300 used in a 3GPP LTE or a 3GPP LTE-A compliant communications system. UL channel structure 300 illustrates resources used to transmit a UL RS, such as resource 305 and resource 307, as well as resources used to transmit a data channel (shown in FIG. 3 as non-crosshatched resources, for example, resource 310 and resource 312). As shown in FIG. 3, the UL RS may have the same frequency resource blocks as the data channel. For instance, a Physical Downlink Control Channel (PDCCH) may indicate the UL resource allocation for a UE and the UE may assume that the UL RS may have the same frequency as the data channel for the UE. Therefore, in a communications system, a number of subcarriers for the UL RS may vary according to the frequency resources allocated for the data channel. Additionally, a length of a sequence being modulated on the subcarriers also varies according to the frequency resources allocated for the data channel.

Depending upon a possible bandwidth size of the UL resource allocation, there may be a group of sequences to be used for UL RS modulation, wherein there may be a number, e.g., one or two, of root sequences corresponding to a size of the UL frequency resource allocation. It is noted that for UL resource allocations of the same size, even the locations of frequency resource allocations may be different in the frequency domain although the sequence used for modulation is the same. Signaling may be used to indicate a sequence group to be used in a single cell. As an example, in the 3GPP LTE Release 8 technical standards, the sequence group is cell-specific and may be specified by unique cell information, such as a cell identifier. With the sequence group specified, the UE may be able to determine one of the sequences in the sequence group for use with a specific UL resource allocation once the UL resource allocation is known.

Utilizing the specified sequence group and the UL resource allocation for the UE, the UE may be able to determine a root sequence used for UL RS modulation, where a root sequence is defined as a specific shifted version from multiple shifted versions of a sequence. As an example, in a 3GPP LTE compliant communications system, three bits used in the PDCCH channel may be used to indicate one of eight possible time-domain cyclic shifts of a root sequence. Table 1 presents a mapping rule that maps the bit states of the three bits to the eight cyclic shifts.

TABLE 1

3GPP LTE mapping rule for three bits to eight cyclic shifts.

| Cyclic Shift Field in DCI format 0 | $n_{DMRS}^{(2)}$ |
|---|---|
| 000 | 0 |
| 001 | 6 |
| 010 | 3 |
| 011 | 4 |
| 100 | 2 |
| 101 | 8 |
| 110 | 10 |
| 111 | 9 |

As an example, if the UE decodes the three bits as 101, then a cyclic shift of eight is applied to the root sequence to obtain the sequence to use in UL RS modulation.

Figure 4:
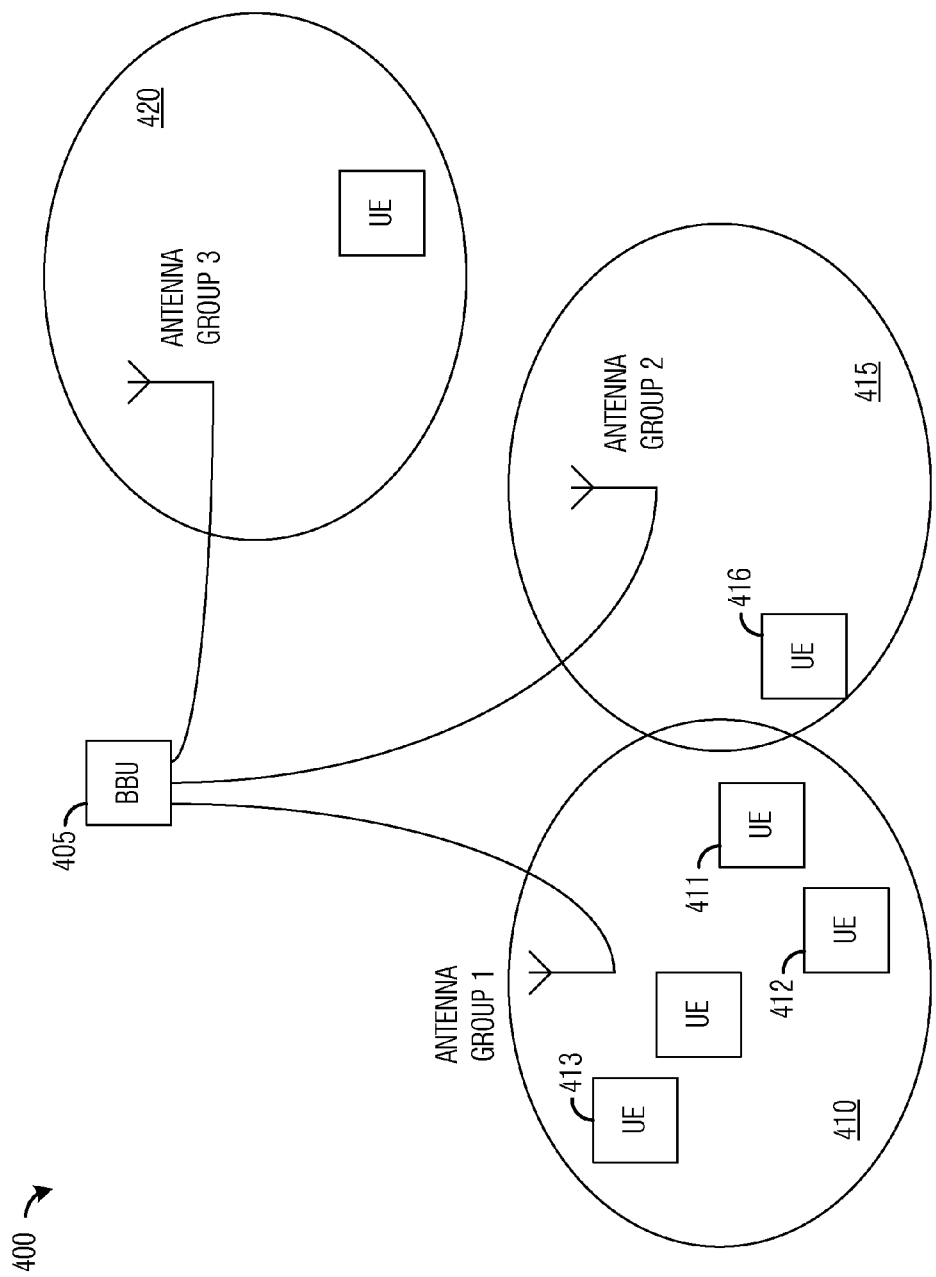
FIG. 4 illustrates an example communications system wherein a single BaseB and Unit (BBU) controls multiple distributed antennas or distributed antennas groups according to example embodiments described herein.

FIG. 4 illustrates a communications system 400 wherein a single BaseBand Unit (BBU) 405 controls multiple distributed antennas or distributed antennas groups. Each distributed antenna or distributed antennas group may be considered to be a cell. For example, distributed antennas group 1 may be considered to be cell 410, distributed antennas group 2 may be considered to be cell 415, and distributed antennas group 3 may be considered to be cell 420. As with a cell of a regular eNB or LPC, a cell of a distributed antennas group may serve UEs. As an example, cell 410 may include a number of UEs, including UE 411, UE 412, and UE 413, while cell 415 may include UE 416.

Supposed that each cell has its own cell identification information, and hence each cell has its own sequence group for UL RS transmissions occurring in each cell. Then, due to their relative close proximity, UL transmissions from UE 411 and UE 416 may cause significant interference with one another. Then, based on the channel conditions, a scheduler (for example, located in BBU 405) may determine whether the signals from UE 411 and UE 416 may be differentiated in the spatial domain, assuming signals from each UE can be received by antennas in cell 410 and cell 415. If the signals from UE 411 and UE 416 may be differentiated in the spatial domain, the UE 411 and UE 416 may use the same resource blocks or overlapping frequency resources. In order to share the same resource blocks or overlapping frequency resources, orthogonal UL RSs may need to be transmitted by UE 411 and UE 416 to reduce interference to one another. But, in order to have orthogonal UL RSs at both UE 411 and UE 416, the same sequence group needs to be used at both UE 411 and UE 416. However, due to the use of fixed cell identification based sequence groups, it is unlikely that the same sequence group will be used at the two UEs.

Consider UE 411 and UE 412 operating within cell 410. Since both UEs are operating within a single cell, they will be using a single sequence group (per the use of fixed cell identification based sequence groups). Therefore, they will have orthogonal UL RSs even with an overlapping UL time-frequency resource allocation and their transmissions may be differentiated in the spatial domain, in other words, their transmissions may be spatially multiplexed. However, depending on certain channel conditions, transmissions from UE 411 and UE 412 may not be differentiated in the spatial domain, and hence UE 411 and UE 412 may not be scheduled to be spatial multiplexed over same or overlapping time-frequency resources although the UL RSs for the two UEs may be orthogonal due to the use of the same sequence group. Therefore, under certain channel conditions, UE 411 and UE 412 may need to be scheduled using FDM and/or TDM to achieve orthogonal UL resource allocation if UE 411 and U 412 cannot be spatially differentiated.

Figure 5:
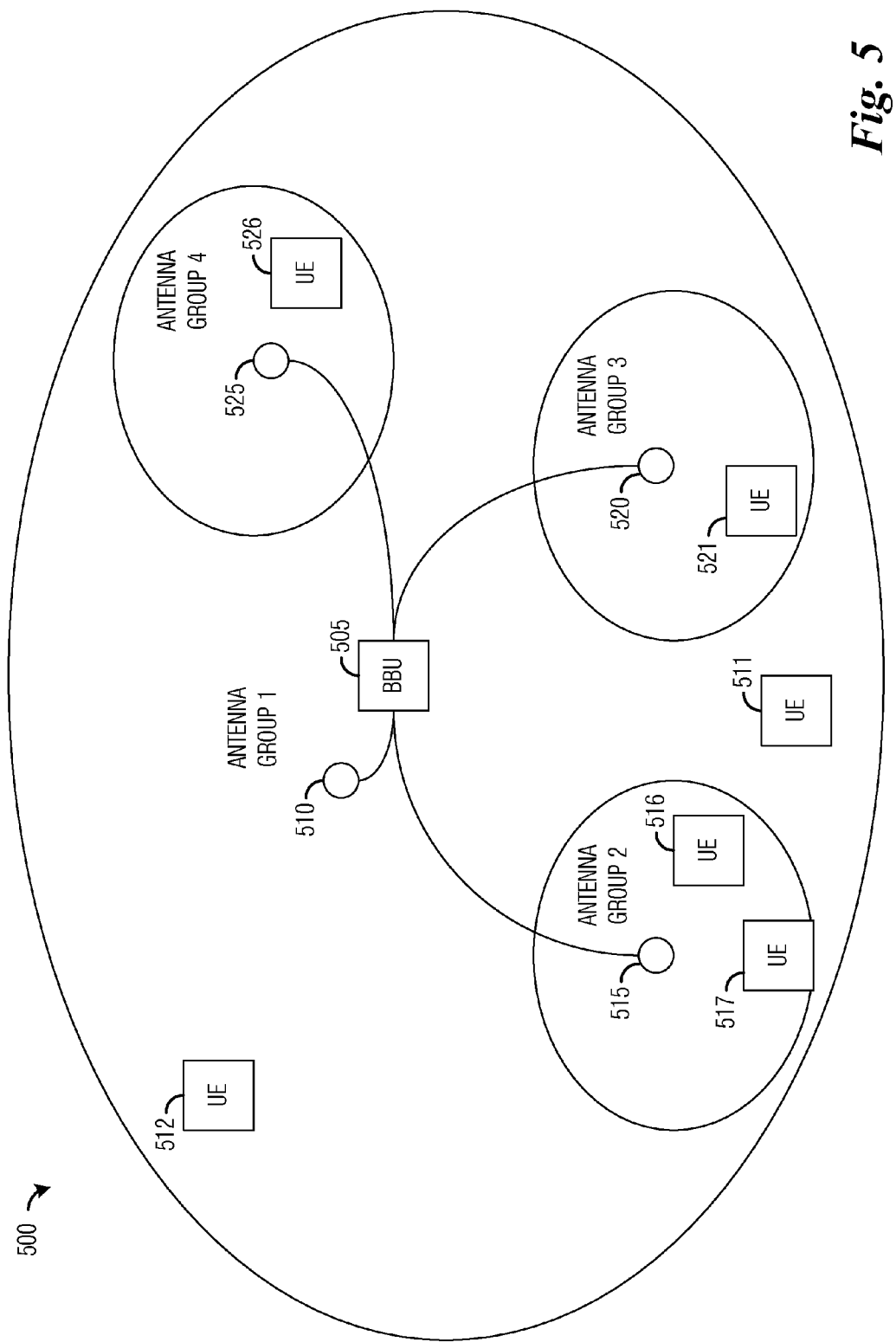
FIG. 5 illustrates an example heterogeneous communications system, commonly referred to as a HetNet according to example embodiments described herein.

FIG. 5 illustrates a heterogeneous communications system 500, commonly referred to as a HetNet. Heterogeneous communications system 500 includes a BBU 505 coupled to transmission points, such as macro point 510 and a plurality of low power points (LPP), such as LPP 515, LPP 520, and LPP 525. BBU 505 may share information, such as scheduling information, UE information, configuration information, and so forth, with transmission points coupled to it. BBU 505 may be considered to be a centralized controller or a coordinator.

Macro point 510 may serve UE 511 and UE 512, LPP 515 may serve UE 516 and UE 517, LPP 520 may serve UE 521, and LPP 520 may serve UE 526.

As shown in FIG. 5, each transmission point may be associated with a different distributed antenna group. For example, macro point 510 may be associated with distributed antenna group 1, LPP 515 may be associated with distributed antenna group 2, LPP 520 may be associated with distributed antenna group 3, and LPP 525 may be associated with distributed antenna group 4.

Supposed that each cell of each transmission point has its own cell identification information, and hence each cell has its own sequence group for UL RS transmissions occurring in each cell. Then, due to their relative close proximity, UL transmissions from UE 511, UE 516, and UE 521 may cause significant interference with one another due to their non-orthogonal UL RSs. In order to have orthogonal UL RSs at UE 511, UE 516, and UE 521, the same sequence group needs to be used at UE 511, UE 516, and UE 521. However, due to the use of fixed cell identification based sequence groups, it is unlikely that the same sequence group will be used by the three UEs.

Conversely, UE 511 and UE 512 are operating within a cell of macro point 510. Since both UEs are operating within a single cell, they will be using a single sequence group and hence, their UL RSs could be orthogonal by allocation different time shifts or different Walsh covering codes for the two UL RSs even with overlapping resource allocation. However, they may have severe interference if two UL RSs are not allocated different time shifts and/or different Walsh covering codes. Particularly, when the UL time-frequency resource allocations for the two UEs are same, different time shifts and/or different Walsh covering code may be allocated to the two UEs for orthogonal UL RSs; while when the UL time-frequency resource allocations for the two UEs are partly overlapping, the sequence group hopping and sequence hopping per slot should be disabled and different Walsh covering codes may be used in order for the two UEs to have orthogonal UL RSs.

In FIG. 5, a single cell-ID may be allocated to all the cells or antennas to deal with the interference of control channels between macro points and LPPs. In such a situation, two UEs may have overlapping UL resource allocation. Since the UL RSs of multiple UEs may have the same sequence group within a single cell, the UL RSs may have severe interference if the UL RSs are not allocated different time-shifts and/or different Wash covering code for orthogonal UL RSs as described previously.

In a 3GPP LTE compliant communications system, a sequence group may be determined based on cell identification information, such as cell id, and higher layer signaling for each slot. A sequence group number u in slot $n_s$ may be defined by a group hopping pattern $f_{gh}(n_s)$ and a sequence shift pattern $f_{ss}$ according to a formula expressible as $$u=(f_{gh}(n_s)+f_{ss}) \bmod 30.$$

Suppose that a single radio frame comprises 10 subframes and each subframe comprises two slots, then the radio frame has 20 slots with the slots numbered from zero to 19.

According to 3GPP LTE, there are 17 different hopping patterns and 30 different sequence shift patterns. Sequence group hopping may be enabled or disabled by means of a cell specific parameter Group-hopping-enabled provided through higher layer signaling. Sequence group hopping for a Physical Uplink Shared Channel (PUSCH) may be disabled for certain UEs through a higher layer parameter Disable-sequence-group-hopping despite being enabled on a cell basis. A Physical Uplink Control Channel (PUCCH) and a PUSCH may have the same hopping pattern but may have different sequence shift patterns.

The group hopping pattern $f_{gh}(n_s)$ for the PUCCH and the PUSCH may be expressed as $$f_{gh}(n_s) = \begin{cases} 0 & \text{if group hopping is disabled} \\ \left(\sum_{i=0}^{7} c(8n_s + i)2^i\right) & \text{if group hopping is enabled,} \end{cases}$$

where c is a pseudo-random sequence as defined in Section 7.2 of the 3GPP Technical Standards TS36.211. A pseudo-random sequence c may be initialized with $$c_{init} = \left\lfloor \frac{N_{ID}^{cell}}{30} \right\rfloor$$

at the beginning of each radio frame, where $N_{ID}^{cell}$ is a cell id and ranges from zero to 503, and $\lfloor x \rfloor$ is a floor function.

The sequence shift pattern $f_{ss}$ may differ between the PUCCH and the PUSCH. For the PUCCH, the sequence shift pattern $f_{ss}^{PUCCH}$ is expressible as $$f_{ss}^{PUCCH}=N_{ID}^{cell} \bmod 30,$$

while for the PUSCH, the sequence shift pattern $f_{ss}^{PUSCH}$ is expressible as $$f_{ss}^{PUSCH}=(f_{ss}^{PUCCH}+\Delta_{ss}) \bmod 30,$$

where as $\Delta_{ss} \in \{0, 1, \ldots, 29\}$ is configured by higher layer signaling.

Therefore, $N_{ID}^{cell}$ may be insufficient to determine a sequence group for a UL RS and $\Delta_{ss} \in \{0, 1, \ldots, 29\}$ may need to be signaled in addition to $N_{ID}^{cell}$ in order to determine the sequence group and the sequence shift pattern.

$$\left\lfloor \frac{N_{ID}^{cell}}{30} \right\rfloor$$

may be used to determine the hopping pattern of the sequence groups, and $(N_{ID}^{cell} \bmod 30+\Delta_{ss}) \bmod 30$ may be used to determine the sequence shift pattern. In order to determine the sequence group, the UE may need to know the cell id and the PUSCH sequence group delta value ($\Delta_{ss} \in \{0, 1, \ldots, 29\}$). Additionally, sequence hopping patterns to select a sequence from two sequences of the same length or shift hopping patterns may be applied for sequences in the sequence group, which, along with sequence group hopping, sequence hopping, and shift hopping, may be determined by $(N_{ID}^{cell} \bmod 30+\Delta_{ss}) \bmod 30$ and $$\left\lfloor \frac{N_{ID}^{cell}}{30} \right\rfloor.$$

Therefore, there is a need for a system and method for signaling and transmitting UL RSs with sufficient flexibility to enable the use of orthogonal UL RSs for UEs of different cells that are operating in close proximity to minimize interference between the UEs. Additionally, any savings in the amount of information that needs to be signaled to the UEs may result in improved overall communications system performance due to reduced signaling overhead.

According to an example embodiment, in order to enable coordination of UL resource allocation of multiple cells and the use of orthogonal UL RSs, a technique that provides for the dynamic changing of a sequence group used by a UE for UL RS modulation may be used. As an example, referencing back to FIG. 4, when UE 411 and UE 416 have an overlapping resource allocation, either a first sequence group used by UE 411 or a second sequence group used by UE 416 may be dynamically changed so that they (the first sequence group and the second sequence group) are the same. Then, different cyclic shifts and/or different Walsh codes may be applied and the result is orthogonal UL RSs. In other words, although UE 411 and UE 416 may be members of different cells, the dynamic changing of sequence groups may allow for the two UEs to use the same sequence group.

Furthermore, when UE 411 and UE 416 are spatially multiplexed to have overlapping resource allocations, UE 413 may also have an overlapping resource allocation with UE 411 and UE 416. However, since UE 413 is located relatively far away from UE 411 and UE 416, UE 413 may use a sequence group normally used by cell 410 without strong interference from UE 411 and/or UE 416, which may potentially use sequence groups different from the sequence group used by UE 411 and UE 416. An interference cancellation algorithm can be applied to detect the signals from UE 411 after a signal from UE 413 is detected at cell 410.

Furthermore, UE 411 and UE 412 may be or may not be spatially multiplexed to use overlapping time-frequency resources when UE 411 and UE 412 could be or couldn't be spatially differentiated at a network side. UE 411 and UE 416 may be or may not be spatially multiplexed to use overlapping time-frequency resource when UE 411 and UE 416 could be or couldn't be spatially differentiated at the network side. Depending on the channel condition, a scheduler at the network side may determine which UE (UE 416 or UE 412, for example) may be spatially multiplexed together with UE 411. In order to have orthogonal UL RSs with either UE 416 or UE 412, UE 411 may dynamically change the UL sequence group by dynamic sequence group allocation. Similarly, the sequence group for UE 412 may be dynamically changed in order to have orthogonal UL RSs with UE 411 or UE 416.

In general, if two UEs are operating in close proximity and/or have similar received signal strength and have overlapping resource allocations, then they should be using the same sequence group with different cyclic shifts and/or different Walsh covering codes in order to support spatial multiplexing, even if they belong to different cells. A UE may dynamically be spatially multiplexed together with either another UE within the same cell or another UE operating within another cell depending on the channel condition. Conversely, even if two UEs belong to a single cell, they may not need to use the same sequence group unless they are have relatively similar received signal strength at the network side and are using overlapping resource allocations.

Not only may the dynamic changing of sequence groups be applied to a cell-edge UE in order to have a sequence group the same as a UE operating in another cell, but it may also be applied to a cell-center UE in order to have a sequence group different from another UE operating within a cell-edge of the same cell.

The dynamic changing of sequence groups described herein may also be applied to heterogeneous communications systems. For example, referencing FIG. 5, the dynamic changing of sequence groups may allow UE 511 and UE 521 (or UE 516 and UE 521) to use orthogonal UL RSs and overlapping resource allocations to support spatial multiplexing. Alternatively, the dynamic changing of sequence groups may allow UE 511 and UE 516 to use different sequence groups for UL RS without producing too much random interference to one another to reduce the scheduling constraints that may arise with the use of a single sequence group.

Figures 6, 7:
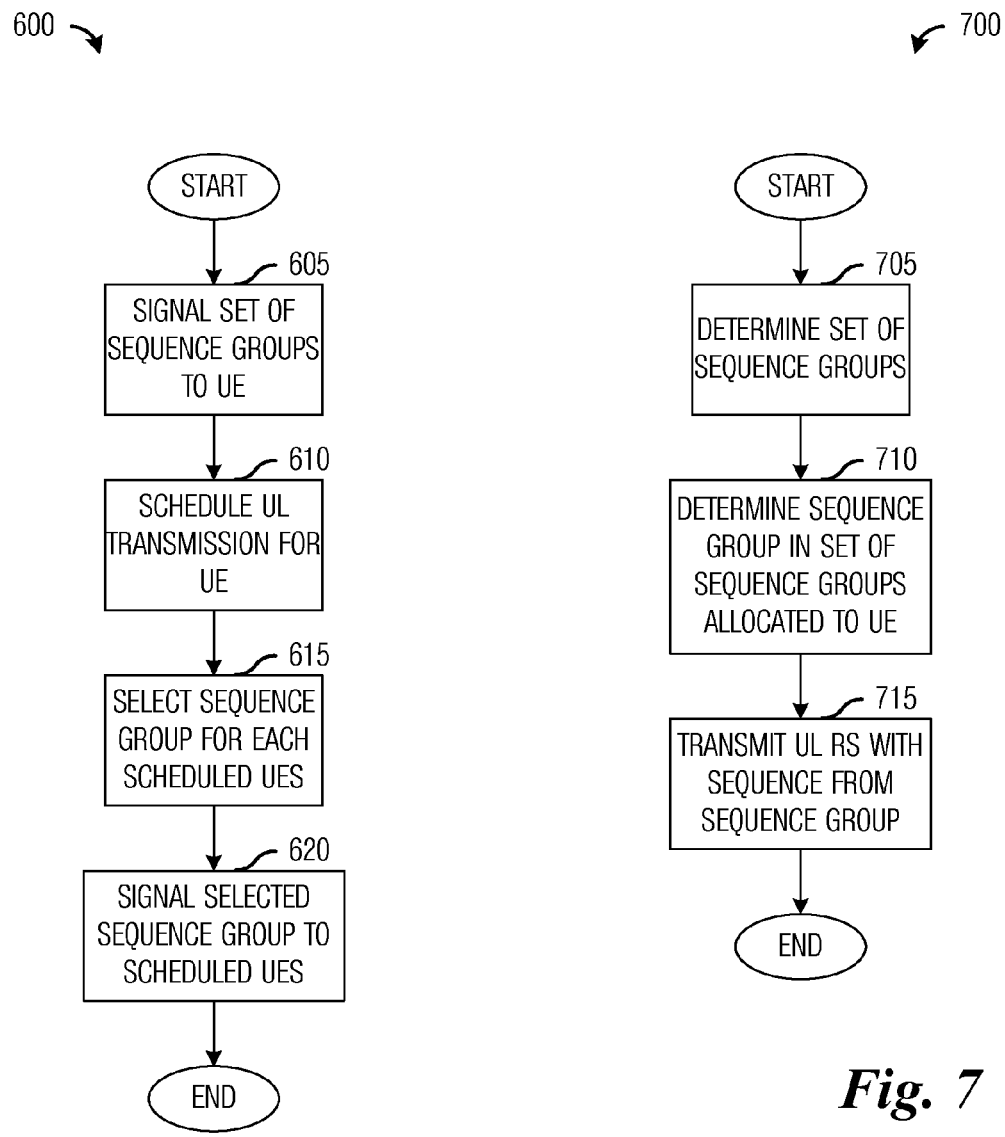
FIG. 6 illustrates an example flow diagram of operations in the dynamic changing of sequence groups according to example embodiments described herein.
FIG. 7 illustrates an example flow diagram of operations in transmitting an UL RS according to example embodiments described herein.

FIG. 6 illustrates a flow diagram of operations 600 in the dynamic changing of sequence groups. Operations 600 may be indicative of operations occurring in a communications controller, such as an eNB or a LPC or a BBU, as the communications controller dynamically changes sequence groups used by UEs. Operations 600 may occur while the communications controller is in a normal operating mode.

Operations 600 may begin with the communications controller signaling a set of sequence groups to UEs served by the communications controller (block 605). According to an example embodiment, the set of sequence groups comprises a collection of possible sequence groups that may be used by the UEs for UL RS modulation. The signaling of the set of sequence groups comprises signaling a shift pattern and a hopping pattern. The signaling of the shift pattern and the hopping pattern may be performed for each sequence group in a subset of sequence groups in the set of sequence groups. The signaling may occur sequentially.

For example, if there are four sequence groups in the set of sequence groups, the signaling may begin with a signaling of a number of sequence groups (four in this example) followed by the shift pattern and the hopping pattern for each sequence group in the set of sequence groups or a number of sequence groups in the subset of sequence groups in the set of sequence groups and then the shift pattern and the hopping pattern for each sequence group in a subset of sequence groups in the set of sequence groups may be signaled to the UEs. As an example, the shift patterns and the hopping patterns of sequence groups in the set of sequence groups that do not correspond to the cell identifier specific sequence group may be signaled.

The signaling of the set of sequence groups may further comprise a hopping disable (or hopping enable) indicator, wherein the hopping disable indicator indicates if sequence group hopping is disabled or enabled. According to an example embodiment, the hopping disable (or hopping enable) indicator may be sequence group specific, a subset of sequence groups specific, or the set of sequence groups specific. If it is sequence group specific, then there may be a hopping disable (or hopping enable) indicator for each sequence group in the subset of sequence groups, while if it is set of sequence group specific, then there may be a single hopping disable (or hopping enable) indicator. With a hopping disable (or hopping enable) indicator, the UE may not need to know information about hopping disable or hopping enable indicators for cell identification specific sequence groups in 3GPP LTE Rel-8/9/10 even though a sequence group is associated with an actual cell. Similarly, in situations when the UE cannot detect a cell (such as with transmission points) or has not detected a cell (such as when the UE is signaled the sequence group information before it detects the cell), the UE may not need to know information about cell specific hopping disable or hopping enable indicators. In other words, the UE may not need to know information about cell specific hopping disable or hopping enable indicators if there isn't an actual cell to be detected by a UE, or if there is a cell to be detected, the UE hasn't detect the cell before the higher layer signaling of the sequence group information is received by the UE.

Alternatively, the signaling of the hopping pattern and/or the hopping disable (or hopping enable) signaling may be performed for a subset of sequence groups in the set of sequence groups in a single transmission.

However, the information about a cell identifier specific sequence group associated with a cell serving a UE may be signaled to the UE by the legacy signaling such as cell-id and the PUSCH sequence group shift pattern delta value even though the set of sequence groups may include the cell identified specific sequence group. The PUSCH sequence group shift pattern delta value could be carried over a broadcast control channel, e.g., a dynamic BCH, of the cell serving the UE.

According to an example embodiment, the set of sequence groups may be signaled to the UEs using higher layer signaling, such as Radio Resource Control (RRC) signaling, Media Access Control (MAC) signaling, or a combination thereof. The signaling may be UE dedicated signaling. A single set of sequence groups may be signaled to each of the UEs or different sets of sequence groups may be signaled to each of the UEs. Alternatively, each communications controller may have a different set of sequence groups that it signals to its own UEs.

As an illustrative example, the signaling of the set of sequence groups may include a five bit sequence group shift pattern $f_{ss}^{PUSCH}$ and a five bit integer value for a sequence group hopping pattern $n_{hop}$, where $n_{hop}$ may be an initial value for a Gold sequence at a starting subframe of each radio frame. Additionally, $n_{hop} \cdot 2^5 + f_{ss}^{PUSCH}$ may be an initial value of a Gold sequence generator at the starting subframe of each radio frame to determine The hopping pattern of sequence hopping and shift hopping, where the hopping may be slot level hopping. $n_{DMRS}^{(1)}$ and hopping disabling signaling may also be signaled to a UE, where $n_{DMRS}^{(1)}$ is a cyclic shift value of the cell, as specified by 3GPP Technical Standard TS36.211.

Signaling $n_{hop}$ and $f_{ss}^{PUSCH}$ is different from signaling a cell id. $n_{DMRS}^{(2)}$ may be determined from information in a PDCCH. A cyclic shift used for a sequence of the sequence group may be expressed as $$(n_{DMRS}^{(1)} + n_{DMRS}^{(2)} + n_{cs_{hop}}) \bmod 12$$

for each slot in a radio frame, where $n_{cs_{hop}}$ may be determined by the cyclic shift hopping pattern for each slot.

To achieve a reduction in the amount of information to be signaled $n_{hop} \cdot 30 + f_{ss}^{PUSCH}$ may be signaled with nine bits instead of 10 bits. A UE receiving $n_{hop} \cdot 30 + f_{ss}^{PUSCH}$ may determine $n_{hop}$ and $f_{ss}^{PUSCH}$ using expressions $$n_{hop} = \left\lfloor \frac{x}{30} \right\rfloor$$

and $$f_{ss}^{PUSCH} = x \bmod 30,$$

where x is a received version of $n_{hop} \cdot 30 + f_{ss}^{PUSCH}$.

As discussed previously, cell id may not be sufficient to determine the sequence group. Instead, a sequence group delta value for PUSCH that may be used together with cell id to determine the sequence group of PUSCH. Expression $$(N_{IC}^{cell} \bmod 30 + \Delta_{ss}) \bmod 30$$

may be used to determine sequence group shift information $f_{ss}^{PUSCH}$ for a UL RS of PUSCH, and expression $$\left\lfloor \frac{N_{ID}^{cell}}{30} \right\rfloor$$

may be used for determining hopping.

According to an example embodiment, it may be possible to directly signal the sequence group id information and $n_{hop}$ (the hopping pattern information). A net reduction in signaling overhead compared to signaling cell id and the PUSCH sequence group delta value may be achieved.

The communications controller may schedule transmissions for a subset of the UEs (block 610). The communications controller may schedule transmissions for UEs based on a number of scheduling criteria, including but not limited to UE priority, amount of available resources, amount of data to transmit, UE service history, UE channel condition, and so on. Furthermore, the communications device may make use of information regarding other scheduled UEs to schedule transmissions. As an example, the communications controller may receive information about UEs scheduled by other communications controllers and if some of the UEs scheduled by the other communications controllers are in close proximity and/or have similar received signal strength corresponding to one or more of its own UEs but could be differentiated in spatial domain, the communications controller may schedule one or more of its own UEs with overlapping resource allocations to exploit spatial multiplexing. The communications controller may also share information about its own scheduled UEs to other communications controllers.

The communications controller may select a sequence group for each of its scheduled UEs (block 615). The communications controller may make use of information about its own scheduled UEs as well as information about scheduled UEs of other communications controllers in the selection of sequence groups for its scheduled UEs. According to an example embodiment, the selection of a specific sequence group from the set of sequence groups may be based on transmissions scheduled by the communications controller and by neighboring communications controllers. As an example, if only a single UE is scheduled for a resource allocation or if there are no overlapping resource allocations, then orthogonal UL RSs may not be needed. In such a situation, cell id based sequence group selection may be utilized. Furthermore, orthogonal UL RSs may be needed for UEs that have overlapping resource allocations and are operating in relatively close proximity and/or have similar received signal strength to one another. In such a situation, the sequence group for one or more of the UEs may be changed so that orthogonal UL RSs are used by the UEs sharing the overlapping resource allocation. Additionally, if the UE is found to have randomized low interference from other UEs, then a different sequence group may be selected for the UE.

In general, a single sequence group may be selected for two or more UEs but with different time shift values in order to have orthogonal UL RSs. Since the UEs may be operating in a single cell or in different cells, scheduling of the UEs may be made more flexible than when compared to the signaling of a group of UEs a static or semi-static sequence group (e.g., cell identifier specific sequence groups) using higher layer signaling. Using static or semi-static sequence groups may result in only 3GPP LTE Release 11 and later compliant UEs having orthogonal UL RSs. However, with dynamic changing of sequence groups, 3GPP LTE Release 11 and later UEs may be coordinated with legacy UEs and the 3GPP LTE Release 11 and later compliant UEs may have their sequence groups changed so that 3GPP LTE Release 11 and later compliant UEs may have orthogonal UL RSs with legacy UEs, while legacy UEs don't need change their sequence groups.

Furthermore, cell identifier specific sequence group selection may require that UEs decode a dynamic Broadcast Channel (BCH) to determine the sequence group information. Additionally, dynamic changing of sequence groups may be used in scenarios with multiple distributed antennas (such as discussed in FIGS. 4 and 5) regardless of single cell identifier or multiple cell identifier cells since cell identity is not required.

The communications controller may signal a specific sequence group out of the set of sequence groups to each of the UEs (block 620). According to an example embodiment, the specific sequence group may be signaled to the UEs using Layer One and/or Layer Two signaling, such as over a PDCCH. As an example, the communications controller may signal an index to the set of sequence groups to each UE, wherein the index corresponds to a sequence or a sequence group in the set of sequence groups.

According to the 3GPP LTE Technical Standards and as shown in Table 1, a three bit value in the PDCCH may be used to indicate the cyclic shift of UL RS signaling. Suppose that there are two sequence groups that may be allocated to a UE, with a first sequence group being determined by cell identification information, such as cell id and/or sequence group id. Denote a root sequence of the first sequence group as s1. A second sequence group is a sequence group signaled by higher layer signaling. Denote a root sequence of the second sequence group as s2. Therefore the three bits may be used to indicate eight different kinds of sequence allocations, four cyclic shifted versions of s1 and four cyclic shifted versions of s2, as an example. For each root sequence, the four cyclic shifts may be any four shifts out of possible cyclic shifts {0, 1, 2, 3, 4, 5, 6, 7, 8, 9, 10, 11} or {0, 2, 3, 4, 6, 8, 9, 10}, as examples.

Although the discussion focuses on the use of a three bit long bit sequence to signal information about the specific sequence group to the UE, other length bit sequences may be used. For example, one, two, three, four, five, six, and so forth, bit long bit sequences may be used to signal information about the specific sequence group. Therefore, the discussion of the three bit long bit sequence should not be construed as being limiting to either the scope or the spirit of the example embodiments.

The three bit value in the PDCCH may also be used to indicate an offset for Hybrid Automatic Repeat Requested (HARQ) acknowledgment and/or negative acknowledgement (ACK/NACK) configuration, wherein the ACK/NACK corresponds to a transport block in the PUSCH assigned by the PDCCH. The ACK/NACK may be determined by the UL's lowest RB index for the UE together with the offset. Typically, the mapping from the three bit states to a cyclic shifted version of a sequence in 3GPP LTE is designed deliberately to ensure different ACK/NACK configurations when allocating different cyclic shifts to the UL RS. Therefore, ACK/NACK allocation collision may need to be considered.

More specifically, in 3GPP Technical Standard TS36.213, the three bits may be used for offset to determine the ACK/NACK configuration in a Physical Hybrid ARQ Indicator Channel (PHICH). In a FDD communications system, the PHICH resource may be identified by an index pair $(n_{PHICH}^{group}, n_{PHICH}^{seq})$, where $n_{PHICH}^{group}$ is a PHICH group number and $n_{PHICH}^{seq}$ is an orthogonal sequence index within the group as defined by $$n_{PHICH}^{group} = (I_{PRB\_RA} + n_{DMRS}) \bmod N_{PHICH}^{group}$$

and $$n_{PHICH}^{seq} = \left(\left\lfloor \frac{I_{PRB\_RA}}{N_{PHICH}^{group}} \right\rfloor + n_{DMRS}\right) \bmod 2N_{SF}^{PHICH},$$

where:

$n_{DMRS}$ is mapped from the cyclic shift for a DMRS field according to Table 2 in a most recent PDCCH with UL Downlink Control Information (DCI) format for the transport block(s) associated with the corresponding PUSCH transmission;

$n_{SF}^{PHICH}$ is a spreading factor size used for PHICH modulation as described in Section 6.9.1 in 3GPP Technical Standards TS36.211, which is four for normal cyclic prefix and two for extended prefix in a FDD communications system;

$$I_{PRB\_RA} = \begin{cases} I_{PRB\_RA}^{lowest\_index} & \text{for the first TB of a PUSCH with associated PDCCH or for the case of no associated PDCCH when the number of negatively acknowledged TBs is not equal to the number of TBs indicated in the most recent PDCCH associated with the corresponding PUSCH} \\ I_{PRB\_RA}^{lowest\_index} + 1 & \text{for a second TB of a PUSCH with associated PDCCH} \end{cases}$$

where $I_{PRB\_RA}^{lowest\_index}$ is a lowest PRB index in the first slot of a corresponding PUSCH transmission; and $N_{PHICH}^{group}$ is a number of PHICH groups configured by higher layer signaling as described in Section 6.9 of 3GPP Technical Standards TS36.211.

TABLE 2

Mapping between $n_{DMRS}$ and the cyclic shift for DMRS field in PDCCH with UL DCI format.

| Cyclic Shift for DMRS Field in PDCCH with uplink DCI format | $n_{DMRS}$ |
|---|---|
| 000 | 0 |
| 001 | 1 |
| 010 | 2 |
| 011 | 3 |
| 100 | 4 |
| 101 | 5 |
| 110 | 6 |
| 111 | 7 |

As an illustrative example, consider the following mapping of three PDCCH bits to cyclic shifts while maintaining a mapping of the three bits to $n_{DMRS}$. Inherit a mapping from 3GPP LTE for a four cyclic shifted version of sequence s1. As an example, select four cyclic shifts {0, 3, 6, 9} from a mapping table, then values 000 maps to 0, 001 maps to 6, 010 maps to 3, and 111 maps to 9. By keeping the mapping rule for the four cyclic shifts as specified in 3GPP LTE, when two UEs have different cyclic shifts for sequence s1, it is likely that the ACK/NACK channels determined by offset $n_{DMRS}$ and the UL resource block index are different for the two UEs. The mapping rule for legacy UE is presented in Table 3.

TABLE 3

Legacy Mapping of Cyclic Shift Field in uplink-related DCI format $n_{DMRS,\lambda}^{(2)}$ and $[w^{(\lambda)}(0)\ w^{(\lambda)}(1)]$.

| Cyclic Shift Field in uplink-related DCI format | $n_{DMRS,\lambda}^{(2)}$ | | | | $[w^{(\lambda)}(0)\ w^{(\lambda)}(1)]$ | | | |
|---|---|---|---|---|---|---|---|---|
| | $\lambda = 0$ | $\lambda = 1$ | $\lambda = 2$ | $\lambda = 3$ | $\lambda = 0$ | $\lambda = 1$ | $\lambda = 2$ | $\lambda = 3$ |
| 000 | 0  | 6  | 3  | 9  | [1 1]  | [1 1]  | [1 −1] | [1 −1] |
| 001 | 6  | 0  | 9  | 3  | [1 −1] | [1 −1] | [1 1]  | [1 1]  |
| 010 | 3  | 9  | 6  | 0  | [1 −1] | [1 −1] | [1 1]  | [1 1]  |
| 011 | 4  | 10 | 7  | 1  | [1 1]  | [1 1]  | [1 1]  | [1 1]  |
| 100 | 2  | 8  | 5  | 11 | [1 1]  | [1 1]  | [1 1]  | [1 1]  |
| 101 | 8  | 2  | 11 | 5  | [1 −1] | [1 −1] | [1 −1] | [1 −1] |
| 110 | 10 | 4  | 1  | 7  | [1 −1] | [1 −1] | [1 −1] | [1 −1] |
| 111 | 9  | 3  | 0  | 6  | [1 1]  | [1 1]  | [1 −1] | [1 −1] |

Where $[w^{(\lambda)}(0)\ w^{(\lambda)}(1)]$ is the Walsh code, $\lambda=0$ $\lambda=1$ $\lambda=2$ $\lambda=3$ denote the indices related with the first, second, third, and fourth antenna ports, respectively.

The remaining bit states may be used for sequence s2. In order to have better orthogonality, cyclic shifts $\{0, 3, 6, 9\}$ or $\{(0+n)\mod 12, (3+n)\mod 12, (6+n)\mod 12, (9+n)\mod 12\}$ are selected instead of the remaining cyclic shifts $\{4, 2, 8, 10\}$ for the cyclic shifts of sequence s2, where n is an integer. As an example, the remaining bit states 011, 100, 101, 110 are mapped to cyclic shifts 9, 0, 6, 3, respectively. The cyclic shifts 4, 2, 8, 10 may have worse performance than 0, 3, 6, 9 since a minimum distance of $\{4, 2, 8, 10\}$ is two instead of three in the case of $\{0, 3, 6, 9\}$. It is noted that in terms of cyclic shifts, three is the largest distance with four cyclic shifts selected out of a sequence comprising 12 cyclic shifts.

Referencing back to FIG. 4, as an illustrative example, when UE 411 and UE 416 are spatially multiplexed and have an overlapping frequency resource allocation, UE 413 may also have an overlapping frequency resource allocation with UE 411 and UE 416 if UE 413 is in cell 410 but relatively far from UE 411 and UE 416 since interference from UE 411 and UE 416 to UE 413 may be relatively small. Therefore, UE 413 may use a cell identifier specific sequence group associated with cell 410, while UE 411 and UE 416 may use a cell identifier specific sequence group associated with cell 415, thereby not causing strong interference to a UL RS of UE 413. As an example, UE 413 or other UEs in cell 410 that is not in close proximity to UE 411 and UE 416 may use bit state 000 (cyclic shift 0) or bit state 001 (cyclic shift 6) in their PDCCH for UL RS.

As discussed above, the remaining bit states 011, 100, 101, 110 may be mapped to cyclic shifts 9, 0, 6, 3 respectively. Other mapping options for the remaining bit states 011, 100, 101, 110 may be 3, 0, 6, 9; 9, 6, 0, 3; or 3, 6, 0, 9. However, not all possible mappings are viable since ACK/NACK conflicts may arise. For example, based on the ACK/NACK mapping rule described above, bit state 100 may have the same ACK/NACK configuration as 000 (cyclic shift j); and bit state 101 may have the same ACK/NACK configuration as 001 (cyclic shift 6); and bit states 110 and/or 011 may have the same ACK/NACK configuration as 010 (cyclic shift 3) and/or 111 (cyclic shift 9) when SF=2 for an extended cyclic prefix and a Number of PHICH group is four, hence if two cyclic shifts (shift 0 and shift 6) of s1 are allocated to UEs with maximal distance six, then with mappings 0, 3, 6, 9; 9, 3, 6, 0; 0, 6, 3, 9; or 9, 6, 3, 0, the two shifts of s2 allocated to UEs without ACK/NACK allocation collision could only be 3 and 6. Here the distance between 3 and 6 is 3 instead of the maximum distance 6.

According to an example embodiment, mappings of the 011, 100, 101, 110 that have cyclic shifts of distance six for sequence s2 for MU-MIMO while avoiding ACK/NACK collisions include 9, 0, 6, 3; 3, 0, 6, 9; 9, 6, 0, 3; or 3, 6, 0, 9. A general mapping rule for bit states to cyclic shifts may be as follows. Map the first set of bit states to cyclic shifts having largest available distance if the second set of bit states have the largest available distance, where the second set of bit states have the same ACK/NACK mapping offsets as the first set of bit states in case of SF=2 and the number of PHICH group is four, for example, a distance of six for the cyclic shifts discussed herein. For example, map a subset of bit states $\{100, 101\}$ to (cyclic shifts+n) modulo a total number of cyclic shifts equal to a largest available distance, where n is an integer, for example $\{(3+n)\mod 12, (9+n)\mod 12\}$. As an example, considering the cyclic shifts discussed herein, the bit states 011, 100, 101, 110 may be mapped to (0+n) mod 12, (3+n) mod 12, (9+n) mod 12, (6+n) mod 12, where n is an integer.

Table 4 illustrates an exemplary mapping between $n_{DMRS}$ and the cyclic shift for two sequences s1 and s2.

TABLE 4

Mapping between $n_{DMRS}$ and the cyclic shift with consideration for ACK/NACK mapping and UL RS orthogonality.

| Cyclic Shift Field in DCI format 0 | $n_{DMRS}^{(2)}$ |
|---|---|
| 000 | 0 (s1) |
| 001 | 6 (s1) |
| 010 | 3 (s1) |
| 011 | 9 (s2) |
| 100 | 0 (s2) |
| 101 | 6 (s2) |
| 110 | 3 (s2) |
| 111 | 9 (s1) |

A Walsh covering code may be use for two UL RS symbols in a subframe to support better orthogonality overall, or orthogonality of the RS with different number of RBs. Therefore, it may be possible to support UEs with partly overlapping resource allocations with orthogonal Walsh covering codes if the UEs are of the same sequence group with sequence group hopping and sequence hopping disabled.

Table 5 illustrates two sequence groups mapping of cyclic shift fields in UL-related DCI format. Table 6 illustrates three sequence group mapping of cyclic shift fields in UL-related DCI format.

TABLE 5

Two Sequence groups Mapping of Cyclic Shift Field in uplink-related DCI format to $n_{DMRS,\lambda}^{(2)}$ and $[w^{(\lambda)}(0)\ w^{(\lambda)}(1)]$.

| Cyclic Shift Field in uplink-related DCI format | Sequence group | $n_{DMRS,\lambda}^{(2)}$ | | | | $[w^{(\lambda)}(0)\ w^{(\lambda)}(1)]$ | | | |
|---|---|---|---|---|---|---|---|---|---|
| | | $\lambda=0$ | $\lambda=1$ | $\lambda=2$ | $\lambda=3$ | $\lambda=0$ | $\lambda=1$ | $\lambda=2$ | $\lambda=3$ |
| 000 | s1 | 0 | 6 | 3 | 9 | [1 1] | [1 1] | [1 −1] | [1 −1] |
| 001 | s1 | 6 | 0 | 9 | 3 | [1 −1] | [1 −1] | [1 1] | [1 1] |
| 010 | s1 | 3 | 9 | 6 | 0 | [1 −1] | [1 −1] | [1 1] | [1 1] |
| 011 | s2 | 9 | 3 | 0 | 6 | [1 1] | [1 1] | [1 −1] | [1 −1] |
| 100 | s2 | 0 | 6 | 3 | 9 | [1 1] | [1 1] | [1 −1] | [1 −1] |
| 101 | s2 | 6 | 0 | 9 | 3 | [1 −1] | [1 −1] | [1 1] | [1 1] |
| 110 | s2 | 3 | 9 | 6 | 0 | [1 −1] | [1 −1] | [1 1] | [1 1] |
| 111 | s1 | 9 | 3 | 0 | 6 | [1 1] | [1 1] | [1 −1] | [1 −1] |

TABLE 6

Three sequence groups Mapping of Cyclic Shift Field in uplink-related DCI format to $n_{DMRS,\lambda}^{(2)}$ and $[w^{(\lambda)}(0)\ w^{(\lambda)}(1)]$.

| Cyclic Shift Field in uplink-related DCI format | Sequence group | $n_{DMRS,\lambda}^{(2)}$ | | | | $[w^{(\lambda)}(0)\ w^{(\lambda)}(1)]$ | | | |
|---|---|---|---|---|---|---|---|---|---|
| | | $\lambda=0$ | $\lambda=1$ | $\lambda=2$ | $\lambda=3$ | $\lambda=0$ | $\lambda=1$ | $\lambda=2$ | $\lambda=3$ |
| 000 | s1 | 0 | 6 | 3 | 9 | [1 1] | [1 1] | [1 −1] | [1 −1] |
| 001 | s1 | 6 | 0 | 9 | 3 | [1 −1] | [1 −1] | [1 1] | [1 1] |
| 010 | s1 | 3 | 9 | 6 | 0 | [1 −1] | [1 −1] | [1 1] | [1 1] |
| 011 | s2 | 9 | 3 | 0 | 6 | [1 1] | [1 1] | [1 −1] | [1 −1] |
| 100 | s3 | 0 | 6 | 3 | 9 | [1 1] | [1 1] | [1 −1] | [1 −1] |
| 101 | s3 | 6 | 0 | 9 | 3 | [1 −1] | [1 −1] | [1 1] | [1 1] |
| 110 | s2 | 3 | 9 | 6 | 0 | [1 −1] | [1 −1] | [1 1] | [1 1] |
| 111 | s1 | 9 | 3 | 0 | 6 | [1 1] | [1 1] | [1 −1] | [1 −1] |

Where s1, s2, s3, . . . , sn are sequence groups indicated in higher layer signaling, n is the total number of sequence groups for the UE, and s1 is the cell identifier specific sequence group (i.e., a legacy sequence group) in 3GPP LTE Rel-8/9/10.

As an illustrative example, sequences with cyclic shifts 0 and 9 have Walsh covering code [+1, +1], while sequences with cyclic shifts 3 and 6 have Walsh covering code [+1, −1]. Therefore, the mapping rules presented previously may make use of the different Walsh covering codes as in 3GPP LTE Rel-10. Then, if there is another UE with an overlapping frequency allocation, a different Walsh covering code may be used to support orthogonal UL RS for the other UE. The shifted sequence s2 may have the same Walsh covering code as the shifted sequence of s1 if the two shift values are same for the two sequences. More generally, the shifted sequence s2 (or s3, and so on) may have different Walsh covering codes.

As discussed previously, three bits in PDCCH may be used for indicating cyclic-shifts of a single sequence group in 3GPP LTE Rel-8/9/10. The three bits may also be reused for an offset in ACK/NACK mapping.

Additional bits can be allocated for PDCCH to indicate the sequence groups and cyclic-shifts, three additional bits, as an example. For example, one state of the new three bit long sequence may be used to indicate the cell identifier specific sequence group, which the cyclic-shifts of the cell identifier specific sequence as indicated by the three bits as specified in 3GPP LTE Rel-8/9/10 (which is referred to herein as a legacy three bit sequence). The remaining bit states of the new three bit long sequence may be used for indicating other sequence groups and cyclic-shifts while the legacy three bit sequence formerly used for cyclic shift indications are used only for offset of ACK/NACK mapping in a situation wherein other sequence groups are used instead of the cell identifier specific sequence group.

Generally, a p-th sequence group comprises a cell identifier specific sequence group, and wherein a p-th subset of states of the bit sequence (the legacy three bit sequence) is mapped to sequences in the cell identifier specific sequence group and is also mapped to ACK/NACK offset for downlink ACK/NACK channel, where the corresponding relationship between sequences in the cell identifier specific sequence group and the ACK/NACK offsets is same as the one for legacy UE, p is a predefined integer. In the example above, p is 1.

According to an example embodiment, higher layer signaling may used to signal more than one sequence groups other than the cell identifier specific sequence group. As an example, two additional sequence groups may be indicated for a slot for a total of three sequence groups. In such a situation, the three bits in the PDCCH may need to indicate cyclic shifts for three sequence groups, e.g., s1, s2, and s3. A possible configuration of the three bits may be to map four bit states to four cyclic shifts for the cell identifier specific sequence group, and two bit states each for the two other sequence groups, where the two bit states for each of the two other sequence groups may map to cyclic shifts with distances equal to a maximum distance to better support orthogonality.

FIG. 7 illustrates a flow diagram of operations 700 in transmitting an UL RS. Operations 700 may be indicative of operations occurring in a communications device, such as a UE, as the communications device transmits an UL RS modulated with a sequence from a sequence group selected from a set of sequence groups. Operations 700 may occur while the communications device is in a normal operating mode.

Operations 700 may begin with the communications device determining a set of sequence groups (block 705). According to an example embodiment, the communications device may receive signaling for a set of sequence groups from a communications controller, such as an eNB or a LPC. The signaling for the set of sequence groups comprises a sequence shift pattern and a sequence hopping pattern. There may be a sequence shift pattern and a sequence hopping pattern for each sequence group in a subset of sequence groups in the set of sequence groups. The signaling may further comprise an optional hopping disable (or hopping enable) indicator. The hopping disable (or hopping enable) indicator may be sequence group specific, subset of sequence groups specific, or set of sequence groups specific. The signaling for the set of sequence groups may be in the form of higher layer signaling, such as RRC signaling or MAC signaling.

The communications device may determine a selected sequence group from the set of sequence groups from the communications controller (block 710). According to an example embodiment, the signaling of the selected sequence group from the set of sequence groups may occur over Layer One and/or Layer Two signaling, such as over a control channel, e.g., a PDCCH. As an example, the communications device may determine a sequence out of a sequence group that has been selected for it for a particular slot or a subframe from an indicator carried in the PDCCH.

The communications device may transmit an UL RS modulated with a sequence of the selected sequence group as signaled by the control channel (block 715).

Figure 8:
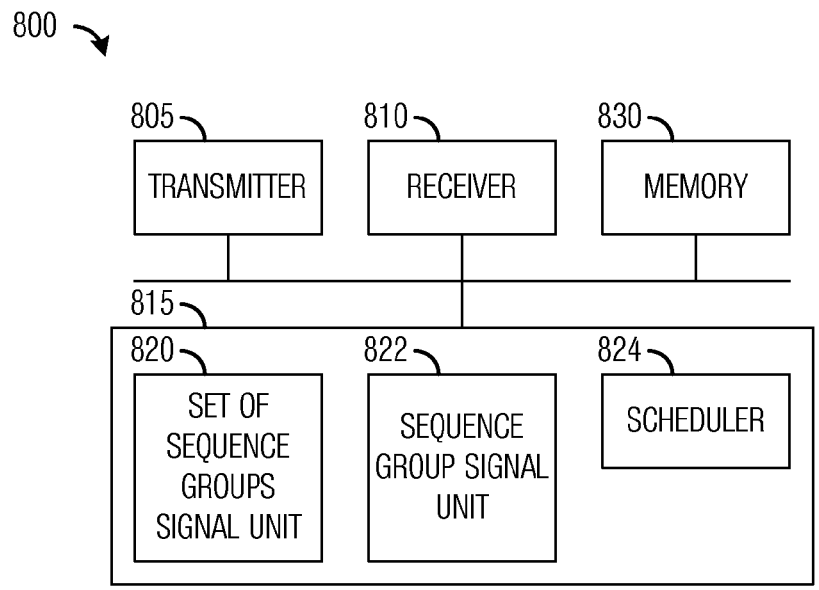
FIG. 8 illustrates an example communications controller according to example embodiments described herein.

FIG. 8 provides an illustration of a communications controller 800. Communications controller 800 may be an implementation of an eNB or a LPC or a BBU. Communications controller 800 may be used to implement various ones of the embodiments discussed herein. As shown in FIG. 8, a transmitter 805 is configured to transmit information and a receiver 810 is configured to receive information. Transmitter 805 and receiver 810 may have a wireless interface, a wireline interface, or a combination thereof. In practice, transmitter 805 and receiver 810 might be implemented in a single unit of hardware.

A set of sequence groups signal unit 820 is configured to signal a set of sequence groups to a communications device. Set of sequence groups signal unit 820 is configured to signal information about sequence groups in the set of sequence groups to communications devices served by communications controller 800. As an example, set of sequence groups signal unit 820 signals a sequence shift pattern and a sequence group hopping pattern and optionally a hopping disable indicator for each sequence group in a subset of sequence groups in the set of sequence groups to the communications devices. Set of sequence groups signal unit 820 signals the set of sequence groups to the communications devices using higher layer signaling, such as RRC signaling or MAC signaling.

A sequence group signal unit 822 is configured to signal a sequence or a sequence group out of the set of sequence groups to each communications device, wherein the sequence group is selected for the communications device. Sequence group signal unit 822 signals the sequence group or an indication of the sequence group using Layer One and/or Layer Two signaling, such as over a control channel. A scheduler 824 is configured to schedule transmission opportunities, e.g., resource allocations, to communications devices served by communications controller 800. Scheduler 824 also selects a sequence group for the communications devices from the set of sequence groups, where the selection of the sequence group is based on factors such as resource allocations, proximity to other communications devices, and so on. Scheduler 824 makes use of scheduling information from other communications controllers operating near communications controller 800, as well as from a centralized controller or coordinator. A memory 830 is configured to store sets of sequence groups, sequence groups, mapping rules, and so forth.

The elements of communications controller 800 may be implemented as specific hardware logic blocks. In an alternative, the elements of communications controller 800 may be implemented as software executing in a processor, microprocessor, digital signal processor, controller, application specific integrated circuit, or so on. In yet another alternative, the elements of communications controller 800 may be implemented as a combination of software and/or hardware.

As an example, transmitter 805 and receiver 810 may be implemented as a specific hardware block, while set of sequence groups signal unit 820, sequence group signal unit 822, and scheduler 824 may be software modules executing in a processor 815, such as a microprocessor, a digital signal processor, a custom circuit, or a custom compiled logic array of a field programmable logic array.

Figure 9:
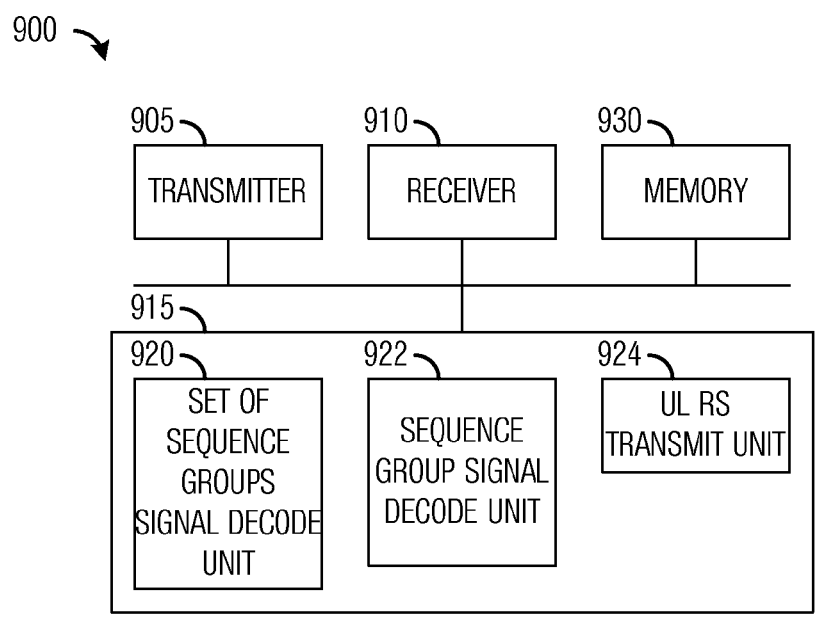
FIG. 9 illustrates an example communications device according to example embodiments described herein.

FIG. 9 provides an illustration of a communications device 900. Communications device 900 may be an implementation of a UE. Communications device 900 may be used to implement various ones of the embodiments discussed herein. As shown in FIG. 9, a transmitter 905 is configured to transmit information and a receiver 910 is configured to receive information. Transmitter 905 and receiver 910 may have a wireless interface, a wireline interface, or a combination thereof. In practice, transmitter 905 and receiver 910 might be implemented in a single unit of hardware.

A set of sequence groups signal decode unit 920 is configured to decode signaling from a communications controller regarding the set of sequence groups from higher layer signaling from the communications controller. The signaling regarding the set of sequence groups comprises a sequence shift pattern and sequence group hopping pattern and optionally a hopping disable indicator for each sequence group in a subset of sequence groups in the set of sequence groups. A sequence group signal decode unit 922 is configured to decode signaling from the communications controller regarding a sequence or a sequence group to be used by communications device 900. Signaling regarding the sequence group is carried in Layer One and/or Layer Two signaling, such as over a control channel. The signaling comprises mapping information of bit states to cyclic offsets. A transmission prepare unit 924 is configured to prepare a RS for transmission on an UL, which includes modulation the RS with a sequence from the sequence group signaled by the communications controller. A memory 930 is configured to store sets of sequence groups, sequence groups, mapping rules, and so forth.

The elements of communications device 900 may be implemented as specific hardware logic blocks. In an alternative, the elements of communications device 900 may be implemented as software executing in a processor, microprocessor, digital signal processor, controller, application specific integrated circuit, or so on. In yet another alternative, the elements of communications device 900 may be implemented as a combination of software and/or hardware.

As an example, transmitter 905 and receiver 910 may be implemented as a specific hardware block, while set of sequence groups signal decode unit 920, sequence group signal decode unit 922, and transmission prepare unit 924 may be software modules executing in a processor 915, such as a microprocessor, a digital signal processor, a custom circuit, or a custom compiled logic array of a field programmable logic array.

The above described embodiments of communications controller 800 and communications device 900 may also be illustrated in terms of methods comprising functional steps and/or non-functional acts. The previous description and related flow diagrams illustrate steps and/or acts that may be performed in practicing example embodiments of the present invention. Usually, functional steps describe the invention in terms of results that are accomplished, whereas non-functional acts describe more specific actions for achieving a particular result. Although the functional steps and/or non-functional acts may be described or claimed in a particular order, the present invention is not necessarily limited to any particular ordering or combination of steps and/or acts. Further, the use (or non use) of steps and/or acts in the recitation of the claims—and in the description of the flow diagrams(s) for FIGS. 6 and 7—is used to indicate the desired specific use (or non-use) of such terms.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for communications controller operations, the method comprising:
   signaling information related to a set of sequence groups to a first communications device, wherein the first communications device uses a sequence in the set of sequence groups to modulate a reference signal;
   selecting a sequence group from the set of sequence groups; and
   signaling information related to the selected sequence group to the first communications device,
   wherein the information related to the selected sequence group comprises an m bit long bit sequence, where m is an integer value,
   wherein the set of sequence groups comprises n sequence groups, where n is an integer,
   wherein a k-th subset of states of the bit sequence is mapped to sequences in a k-th sequence group, where k is an integer value and ranges from 1 to n, and wherein a p-th sequence group comprises a cell identifier specific sequence group, and
   wherein a p-th subset of states of the bit sequence is mapped to sequences in the cell identifier specific sequence group and is further mapped to ACK/NACK offsets for a downlink ACK/NACK channel, where a corresponding relationship between sequences in the cell identifier specific sequence group and the ACK/NACK offsets is the same as a relationship for legacy communications devices, and p is a predefined integer value.

2. The method of claim 1, wherein the signaling information related to the set of sequence groups comprises signaling the information related to the set of sequence groups using higher layer signaling.

3. The method of claim 2, wherein the higher layer signaling comprises radio resource control signaling or media access control signaling.

4. The method of claim 1, wherein the information related to the set of sequence groups comprises a sequence shift pattern and a sequence group hopping pattern for each sequence group in a subset of sequence groups in the set of sequence groups.

5. The method of claim 4, wherein the information related to the set of sequence groups further comprises a number of sequence groups in the set of sequence groups.

6. The method of claim 4, wherein the information related to the subset of sequence groups further comprises a hopping disable indicator.

7. The method of claim 6, wherein there is a hopping disable indicator for each sequence group in the subset of sequence groups.

8. The method of claim 1, further comprising scheduling a first resource allocation for the first communications device.

9. The method of claim 8, wherein the selecting a sequence group is based on the first resource allocation.

10. The method of claim 9, wherein the first communications device is served by a first communications controller, and wherein selecting the sequence group is further based on a second resource allocation for a second communications device served by the first communications controller.

11. The method of claim 9, wherein the first communications device is served by a first communications controller, and wherein the selecting the sequence group is further based on a third resource allocation for a third communications device served by a second communications controller.

12. The method of claim 9, wherein the first resource allocation overlaps at least in part with a fourth resource allocation for a fourth communications device, and wherein the selected sequence group is equal to a sequence group selected the fourth communications device.

13. The method of claim 1, wherein the signaling information related to the selected sequence group comprises signaling the information about the selected sequence group using Layer One and/or Layer Two signaling.

14. The method of claim 1, wherein the states of the k-th subset of states are mapped to sequences in the k-th sequence group that are a largest distance away from other sequences in the k-th sequence group in terms of cyclic shifts.

15. The method of claim 1, where the information related to the set of sequence groups comprise a single hopping disable indicator for the set of sequence groups.

16. A method for communications device operations, the method comprising:
   decoding a first signaling from a communications controller to retrieve information related to a set of sequence groups or to a sub-set of sequence groups in the set of sequence groups;
   decoding a second signaling from the communications controller to retrieve information related to a selected sequence group within the set of sequence groups;

modulating a reference signal with a sequence from the selected sequence group; and transmitting the modulated reference signal, wherein the information related to the selected sequence group comprises an m bit long bit sequence, where m is an integer value, wherein the set of sequence groups comprises n sequence groups, where n is an integer, and wherein a k-th subset of states of the bit sequence is mapped to sequences in a k-th sequence group, where k is an integer value and ranges from 1 to n, wherein a p-th sequence group comprises a cell identifier specific sequence group, and wherein a p-th subset of states of bit sequence is mapped to sequences in the cell identifier specific sequence group and is further mapped to ACK/NACK offsets for a downlink ACK/NACK channel, where a corresponding relationship between sequences in the cell identifier specific sequence group and the ACK/NACK offsets is the same as a relationship for legacy communications devices, and p is a predefined integer.

17. The method of claim 16, wherein the first signaling is transmitted by higher layer signaling.

18. The method of claim 17, wherein the higher layer signaling comprises radio resource control signaling or media access control signaling.

19. The method of claim 16, wherein the second signaling comprises Layer One and/or Layer Two signaling.

20. The method of claim 19, wherein the information related to the set of sequence groups comprises a sequence shift pattern and a sequence group hopping pattern for each sequence group in a subset of sequence groups in the set of sequence groups.

21. The method of claim 20, wherein the information related to the subset of sequence groups further comprises a hopping disable indicator.

22. The method of claim 16, wherein the bit sequence corresponds to a sequence in the selected sequence group.

23. The method of claim 16, wherein the states of the k-th subset of states are mapped to sequences in the k-th sequence group that are a largest distance away from other sequences in the k-th sequence group in terms of cyclic shifts.

24. The method of claim 16, wherein decoding a first signaling from a communications controller to retrieve information related to the subset of sequence groups comprises:

obtaining a sequence group hopping pattern information for the PUSCH in accordance with the formula: $n_{hop}=\lfloor x/30 \rfloor$, where $n_{hop}$ is the sequence group hopping pattern information, and x is a value configured by higher layer signaling; and obtaining a sequence shift pattern for the PUSCH in accordance with the formula:

$f_{ss}^{PUSCH}=x \mod 30$, where $f_{ss}^{PUSCH}$ is the sequence-shift pattern for the PUSCH.

25. The method of claim 24, wherein x is a received version of $n_{hop} \times 30 + f_{ss}^{PUSCH}$, where $n_{hop}$ is an integer between zero and sixteen, and $f_{ss}^{PUSCH}$ is an integer between zero and twenty-nine.

26. A device comprising:

a scheduler configured to select a sequence group from a set of sequence groups; and a signaling unit configured to signal information related to the set of sequence groups to a first communications device, wherein the first communications device uses a sequence in the set of sequence groups to modulate a reference signal, and to signal information related to the selected sequence group to the first communications device, wherein the information related to the selected sequence group comprises an m bit long bit sequence, where m is an integer value, wherein the set of sequence groups comprises n sequence groups, where n is an integer wherein a k-th subset of states of the bit sequence is mapped to sequences in a k-th sequence group, where k is an integer value and ranges from 1 to n, and wherein a p-th sequence group comprises a cell identifier specific sequence group, and wherein a p-th subset of states of the bit sequence is mapped to sequences in the cell identifier specific sequence group and is further mapped to ACK/NACK offsets for a downlink ACK/NACK channel, where a corresponding relationship between sequences in the cell identifier specific sequence group and the ACK/NACK offsets is the same as a relationship for legacy communications devices, and p is a predefined integer value.

27. The device of claim 26, wherein the information related to the set of sequence groups is signaled using higher layer signaling.

28. The device of claim 26, wherein the information related to the set of sequence groups comprises a sequence shift pattern and a sequence group hopping pattern for each sequence group in a subset of sequence groups in the set of sequence groups.

29. The device of claim 26, wherein the scheduler is further configured to schedule a first resource allocation for the first communications device, and wherein the scheduler selects the sequence group based on the first resource allocation.

30. The device of claim 26, wherein the first communications device is served by the device, and wherein the scheduler selects the sequence group based on a second resource allocation for a second communications device served by the device.

31. The device of claim 26, wherein the information related to the selected sequence group is signaled using Layer One and/or Layer Two signaling.

32. The device of claim 26, wherein the information related to the selected sequence group comprises an m bit long bit sequence, where m is an integer value.

33. The device of claim 32, wherein the set of sequence groups comprises n sequence groups, wherein a k-th subset of states of the bit sequence is mapped to sequences in a k-th sequence group, where k is an integer value and ranges from 1 to n, and wherein a p-th sequence group comprises a cell identifier specific sequence group, and p is a predefined integer value.

34. A communications device comprising: a first signaling decoding unit configured to decode a first signaling from a communication controller to retrieve information related to a set of sequence groups; a second signaling decoding unit configured to decode a second signaling from the communications controller to retrieve information related to a selected sequence group; a transmission prepare unit configured to modulate a reference signal with a sequence from the selected sequence group; and a transmitter configured to transmit the modulated reference signal, wherein the information related to the selected sequence group comprises an m bit long bit sequence, where m is an integer value, wherein the set of sequence groups comprises n sequence groups, where n is an integer ,wherein a k-th subset of states of the bit sequence is mapped to sequences in a k-th sequence group, where k is an integer value and ranges from 1 to n, wherein a p-th sequence group comprises a cell identifier specific sequence group, and wherein a p-th subset of states of bit sequence is mapped to sequences in the cell identifier specific sequence group and is further mapped to ACK/NACK offsets for a downlink ACK/NACK channel, where a corresponding relationship between sequences in the cell identifier specific sequence group and the ACK/NACK offsets is the same as a relationship for legacy communications devices, and p is a predefined integer.

35. The device of claim 34, wherein the information related to the set of sequence groups comprises a sequence shift pattern and a sequence group hopping pattern for each sequence group in a subset of sequence groups in the set of sequence groups.

36. The device of claim 35, wherein the information related to the subset of sequence groups further comprises a hopping disable indicator.

37. The device of claim 34, wherein the information related to the selected sequence group comprises an m bit long bit sequence, where m is an integer value.

38. The device of claim 37, wherein the bit sequence corresponds to a sequence in the selected sequence group.

39. A method for determining a sequence for a reference signal of a physical uplink shared channel (PUSCH), the method comprising:
   determining, by a user equipment (UE), whether a value "x" for determining a sequence group of the PUSCH has been provided by higher layer signaling, where "x" is a real number;
   if the value "x" for determining a sequence group of the PUSCH has been provided by higher layer signaling, then:
   determining a sequence shift pattern for the PUSCH in accordance with the formula:
   $f_{ss}^{PUSCH}$=xmod 30, where $f_{ss}^{PUSCH}$ is the sequence-shift pattern for the PUSCH; and
   determining a sequence group hopping pattern information for the PUSCH in accordance with the formula: $n_{hop}=\lfloor x/30 \rfloor$, where $n_{hop}$ the sequence group hopping pattern information, where "n" is a real number; and
   if the value "x" for determining a sequence group of the PUSCH has not been provided by higher layer signaling, then:
   determining the sequence shift pattern for a sequence group of PUSCH in accordance with the formula: $f_{ss}^{PUSCH}=(N_{ID}^{cell}=\Delta_{ss})$mod 30, where $f_{ss}^{PUSCH}$ is the sequence-shift pattern for the PUSCH, $\Delta_{ss}$ is a PUSCH sequence group delta value that is configured by higher layer signaling, and $N_{ID}^{cell}$ is a physical-layer cell identity; and
   determining a sequence group hopping pattern information for the PUSCH in accordance with the formula: $n_{hop}=\lfloor N_{ID}^{cell}/30 \rfloor$, where $n_{hop}$ is the sequence group hopping pattern information.

40. The method of claim 39 further comprising:
   determining an initial value for the sequence hopping pattern or shift hopping pattern, wherein the initial value is determined to be equal to $\lfloor x/30 \rfloor \cdot 2^5 + (x \bmod 30)$.

41. The method of claim 39, where the value "x" is a received version of $n_{hop} \cdot 30 + f_{ss}^{PUSCH}$, wherein $n_{hop}$ is an integer between zero and sixteen, and wherein $f_{ss}^{PUSCH}$ is an integer between zero and twenty-nine.

42. A method for signaling a sequence for a reference signal of a physical uplink shared channel (PUSCH), the method comprising:
   signaling, by an enhanced node B (eNB), a value "x" for a sequence group of the PUSCH via higher layer signaling, where "x" is a real number,
   wherein the value "x" is used to determine a sequence shift pattern for the PUSCH in accordance with the formula: $f_{ss}^{PUSCH}$=xmod 30, where $f_{ss}^{PUSCH}$ is the sequence-shift pattern for the PUSCH, and
   wherein the value "x" is used to determine a sequence shift pattern for the PUSCH in accordance with the formula: $f_{ss}^{PUSCH}$=x mod 30, where $f_{ss}^{PUSCH}$ is the sequence-shift pattern for the PUSCH, and wherein the value "x" is used to determine a sequence group hopping pattern information for the PUSCH in accordance with the formula: $n_{hop}=\lfloor x/30 \rfloor$, where $n_{hop}$ is the sequence group hopping pattern information, where "n" is a real number.

43. The method of claim 42, wherein the value "x" is used to determine an initial value for the sequence hopping pattern or shift hopping pattern, and wherein the initial value is determined to be equal to $\lfloor x/30 \rfloor \cdot 2^5 + (x \bmod 30)$.

44. The method of claim 42, wherein the value "x" is equal to $n_{hop} \cdot 30 + f_{ss}^{PUSCH}$, wherein $n_{hop}$ is an integer between zero and sixteen, and wherein $f_{ss}^{PUSCH}$ is an integer between zero and twenty-nine.

45. A method for determining a sequence shift pattern ($f_{ss}^{PUSCH}$) for a physical uplink shared channel (PUSCH), the method comprising:
   determining, by a user equipment (UE), the $f_{ss}^{PUSCH}$ in accordance with the formula $f_{ss}^{PUSCH}=(N_{ID}^{cell}=\Delta_{ss})$ mod30, where $\Delta_{ss}$ is a PUSCH sequence group delta value configured by higher layer signaling and $N_{ID}^{cell}$ is a physical layer cell identity; identifying, by the UE, resources of the PUSCH in accordance with the $f_{ss}^{PUSCH}$.

46. The method of claim 45, further comprising:
   determining a sequence group hopping pattern information ($c_{int}$) for the PUSCH in accordance with the formula $c_{int}=n_{ID}^{RS}/30$, where $n_{ID}^{RS}$ is equal to $N_{ID}^{cell}$.

47. The method of claim 45, further comprising:
   determining a sequence group hopping pattern information ($c_{int}$) for the PUSCH in accordance with the formula $c_{int}=N_{ID}^{cell}/30$.

* * * * *

UNITED STATES PATENT AND TRADEMARK OFFICE
CERTIFICATE OF CORRECTION

PATENT NO. : 8,693,420 B2
APPLICATION NO. : 13/207278
DATED : April 8, 2014
INVENTOR(S) : Bingyu Qu It is certified that error appears in the above-identified patent and that said Letters Patent is hereby corrected as shown below:

In the Claims

In Col. 23, line 58, claim 25, delete " $n_{hop}\ _x 30+ f_{ss}^{PUSCH}$ " and insert -- $n_{hop} \times 30+ f_{ss}^{PUSCH}$ --.

In Col. 24, line 53 - Col. 25, line 9, delete claim 34 in its entirety and replace it with --34. A communications device comprising:
    a first signaling decoding unit configured to decode a first signaling from a communication controller to retrieve information related to a set of sequence groups;
    a second signaling decoding unit configured to decode a second signaling from the communications controller to retrieve information related to a selected sequence group;
    a transmission prepare unit configured to modulate a reference signal with a sequence from the selected sequence group; and
    a transmitter configured to transmit the modulated reference signal,
    wherein the information related to the selected sequence group comprises an m bit long bit sequence, where m is an integer value,
    wherein the set of sequence groups comprises n sequence groups, and wherein a k-th subset of states of the bit sequence is mapped to sequences in a k-th sequence group, where k is an integer value and ranges from 1 to n,
    wherein a p-th sequence group comprises a cell identifier specific sequence group, and
    wherein a p-th subset of states of bit sequence is mapped to sequences in the cell identifier specific sequence group and is further mapped to ACK/NACK offsets for a downlink ACK/NACK channel, where a corresponding relationship between sequences in the cell identifier specific sequence group and the ACK/NACK offsets is the same as a relationship for legacy communications devices, and p is a predefined integer.--.

In Col. 25, line 39, claim 39, delete "$n_{hop}$ the sequence" and insert --$n_{hop}$ is the sequence--.

In Col. 25, line 46, claim 39, delete " $f_{ss}^{PUSCH} = (N_{ID}^{cell} = \Delta_{ss})$ " and insert -- $f_{ss}^{PUSCH} = (N_{ID}^{cell} + \Delta_{ss})$ --.

Signed and Sealed this
Twenty-fourth Day of June, 2014

Michelle K. Lee
*Deputy Director of the United States Patent and Trademark Office*

CERTIFICATE OF CORRECTION (continued)

In Col. 26, lines 19-22, claim 42, delete "wherein the value "x" is used to determine a sequence shift pattern for the PUSCH in accordance with the formula: $f_{ss}^{PUSCH}$ =x mod 30, where $f_{ss}^{PUSCH}$ is the sequence-shift pattern for the PUSCH, and".

In Col. 26, line 39, claim 45, delete " $f_{ss}^{PUSCH} = (N_{ID}^{cell} = \Delta_{ss})$ " and insert -- $f_{ss}^{PUSCH} = (N_{ID}^{cell} + \Delta_{ss})$ --.

In Col. 26, line 48, claim 46, delete " $c_{int} = n_{ID}^{RS}/30,$ " and insert -- $c_{int} = \dfrac{n_{ID}^{RS}}{30}$ --.

In Col. 26, line 55, claim 47, delete " $c_{int} = N_{ID}^{cell}/30$ " and insert -- $c_{int} = \dfrac{N_{ID}^{cell}}{30}$ --.